United States Patent
Sun et al.

(10) Patent No.: US 11,145,265 B2
(45) Date of Patent: Oct. 12, 2021

(54) DISPLAY DEVICE AND DRIVING METHOD THEREFOR

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Yukun Sun, Beijing (CN); Wenyu Li, Beijing (CN); Zhifu Li, Beijing (CN); Mingyang Yan, Beijing (CN); Qingwen Fan, Beijing (CN); Jinghua Miao, Beijing (CN); Huidong He, Beijing (CN); Shuo Zhang, Beijing (CN); Lili Chen, Beijing (CN); Hao Zhang, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

(*) Notice: Subject to any disclaimer, the term of this patent is extended or adjusted under 35 U.S.C. 154(b) by 27 days.

(21) Appl. No.: 16/825,859

(22) Filed: Mar. 20, 2020

(65) Prior Publication Data
US 2021/0097945 A1 Apr. 1, 2021

(30) Foreign Application Priority Data
Sep. 30, 2019 (CN) .......................... 201910948747.2

(51) Int. Cl.
G09G 3/36 (2006.01)
G02B 27/01 (2006.01)
G09G 5/10 (2006.01)

(52) U.S. Cl.
CPC ....... *G09G 3/3607* (2013.01); *G02B 27/0172* (2013.01); *G09G 5/10* (2013.01);
(Continued)

(58) Field of Classification Search
CPC .... G09G 5/10; G09G 3/3607; G02B 27/0172; G02B 2027/014
See application file for complete search history.

(56) References Cited

U.S. PATENT DOCUMENTS

2016/0247459 A1* 8/2016 Fan ...................... G09G 3/3413

* cited by examiner

*Primary Examiner* — Kent W Chang
*Assistant Examiner* — Chayce R Bibbee
(74) *Attorney, Agent, or Firm* — Womble Bond Dickinson (US) LLP (57) ABSTRACT

Embodiments of the present disclosure provide a method for driving a display device to display an image sequence and a display device therefor. The display device includes a backlight module having a plurality of backlight partitions. The image sequence includes at least a first frame image and a second frame image. The method includes determining a first region in the first frame image and a second region in the second frame image that correspond to an overlapping portion of the first frame image and second frame image as overlapping regions; obtaining, based at least partially on a first backlight value of a first backlight partition(s) corresponding to the first region, a second backlight value of a second backlight partition corresponding to the second region; and controlling a backlight brightness of the second backlight partition based on the second backlight value when the display device displays the second frame image.

20 Claims, 7 Drawing Sheets

(52) U.S. Cl.
CPC .............. *G02B 2027/014* (2013.01); *G09G 2320/0646* (2013.01)

Device Coordinate System

FIG. 4A

Image Field of View Coordinate System

DISPLAY DEVICE AND DRIVING METHOD THEREFOR

CROSS REFERENCE

The present application claims the benefit of Chinese Patent Application No. 201910948747.2, filed on Sep. 30, 2019, the entire disclosures of which are incorporated herein by reference.

FIELD

The present disclosure relates to the field of display technologies, and more specifically to a display device and a driving method therefor.

BACKGROUND

As technologies advance and demands grow, the liquid crystal display (LCD) technology has become one of the mainstream display technologies on electronic devices. Compared with other display technologies, for example, compared with organic light emitting diode (OLED) technology, the LCD technology has advantages such as mature process, lower cost and long service life, and is therefore widely used by major electronic device manufacturers.

However, since the light-emitting principle of the LCD technology lies in allowing light to selectively pass by using the diversion of liquid crystal modules under control of voltage, a backlight module rather than pixels themselves must be used to emit light. Therefore, compared with the OLED technology, the LCD technology exhibits a lower contrast (particularly, hard to present pure black pixels) and higher power consumption.

For this reason, an approach for improving the contrast of the LCD display is proposed and usually referred to as a local dimming technology. However, when the local dimming technology is used, obvious problems such as latency, afterimage and freezing often occur in the display device.

SUMMARY

To at least solve or alleviate the above technical problems, according to some embodiments of the present disclosure, there are provided a method for driving a display device to display an image sequence and a relevant display device.

According to one aspect, an embodiment of the present disclosure provides a method for driving a display device to display an image sequence. The display device comprises a backlight module having a plurality of backlight partitions. The image sequence at least comprises a first frame image and a second frame image. The method comprises determining a first region in the first frame image and a second region in the second frame image as overlapping regions, the first region and the second region corresponding to an overlapping portion between the first frame image and second frame image; obtaining, based at least partially on a first backlight value of one or more first backlight partitions corresponding to the first region, a second backlight value of a second backlight partition corresponding to the second region; and controlling a backlight brightness of the second backlight partition based on the second backlight value when the display device displays the second frame image.

In some embodiments, the first frame image and the second frame image are adjacent frames in the image sequence. The determining the first region in the first frame image and the second region in the second frame image as the overlapping regions of the two frame images comprises determining the first region and the second region as the overlapping regions only when an area of the first region or the second region is greater than or equal to an area of a single backlight partition.

In some embodiments, the obtaining the second backlight value of the second backlight partition corresponding to the second region comprises: determining area occupation ratios of multiple first backlight partitions which are in a partially overlapping relationship with the second backlight partition in the second backlight partition; and determining the second backlight value of the second backlight partition based on first backlight values of the multiple first backlight partitions and their respective area occupation ratios.

In some embodiments, the obtaining the second backlight value of the second backlight partition comprises calculating the second backlight value according to a following equation:

$$B = \sum_{i=1}^{n} \left( \frac{s_i}{s} \times b_i \right)$$

where B is the second backlight value of the second backlight partition, $s_i$ is an overlapping area of the second backlight partition and a $i^{th}$ first backlight partition that is in a partially overlapping relationship with it, s is an area of a single backlight partition, $b_i$ is a first backlight value for the $i^{th}$ first backlight partition, and n is a number of the first backlight partitions that are in a partially overlapping relationship with the second backlight partition.

In some embodiments, the determining the first region in the first frame image and the second region in the second frame image as the overlapping region of two frame images comprises determining that the first region and the second region are non-overlapping regions when an area of the first region or the second region is smaller than an area of a single backlight partition, and obtaining the backlight value of the backlight partition corresponding to the second region based on image data of the second region of the second frame image.

In some embodiments, the display device is a virtual reality VR device. The determining the first region in the first frame image and the second region in the second frame image as an overlapping region between two frame images comprises: obtaining a first posture of the VR device corresponding to the first frame image and a second posture of the VR device corresponding to the second frame image; determining a pixel mapping relationship between the first frame image and the second frame image based on the first posture and the second posture; and determining the first region and the second region based on the pixel mapping relationship.

In some embodiments, the first posture is characterized by a first posture quaternion $Q_1$, and the second posture is characterized by a second posture quaternion $Q_2$. The determining the pixel mapping relationship between the first frame image and the second frame image comprises: determining a posture conversion relationship Q of the VR device based on the first posture quaternion $Q_1$ and the second posture quaternion $Q_2$ according to a following equation: $Q = Q_2^{-1} * Q_1$; obtaining a coordinate conversion relationship M between a VR device coordinate system and an image field of view coordinate system; and determining the pixel mapping relationship T between the first frame image and the second frame image according to a following equation:

$$T = M^{-1}QM$$

where Q is a matrix form of the posture conversion relationship, and M is a matrix form of the coordinate conversion relationship.

In some embodiments, the determining the first region and the second region based on the pixel mapping relationship comprises: mapping a first pixel in the first frame image to a corresponding second pixel in the second posture according to the pixel mapping relationship; in response to the second pixel being within a range of the second frame image, determining that the first pixel and the second pixel belong to the overlapping region; and determining the first region and the second region respectively based on the first pixel and second pixel that belong to the overlapping region.

According to another aspect, there is provided a display device. The display device is used to display an image sequence. The image sequence at least comprises a first frame image and a second frame image. The display device comprises: a backlight module having a plurality of backlight partitions; and a display controller. The display controller is communicatively connected to the backlight module to control backlight brightnesses of the backlight partitions when the display device displays the image sequence. The display controller is configured to: determine a first region in the first frame image and a second region in the second frame image as overlapping regions, the first region and the second region corresponding to an overlapping portion between the first frame image and second frame image; obtain a second backlight value of a second backlight partition corresponding to the second region based at least partially on a first backlight value of one or more first backlight partitions corresponding to the first region; and control a backlight brightness of the second backlight partition based on the second backlight value when the display device displays the second frame image.

In some embodiments, the display device further comprises a display module. The display module is communicatively connected to the display controller and configured to display the image sequence under control of the display controller.

In some embodiments, the first frame image and the second frame image are adjacent frames in the image sequence. The display controller is configured to determine the first region and the second region as the overlapping regions only when an area of the first region and the second region (i.e., the overlapping region) is greater than or equal to an area of a single backlight partition.

In some embodiments, the display controller is configured to determine a corresponding area occupation ratios of multiple first backlight partitions which are in a partially overlapping relationship with the second backlight partition in the second backlight partition; and determine the second backlight value of the second backlight partition based on the first backlight value of the multiple first backlight partitions and their corresponding area occupation ratio.

In some embodiments, the display controller is configured to calculate the second backlight value according to a following equation:

$$B = \sum_{i=1}^{n} \left( \frac{s_i}{s} \times b_i \right)$$

where B is the second backlight value of the second backlight partition, $s_i$ is an overlapping area of the second backlight partition and a $i^{th}$ first backlight partition that is in a partially overlapping relationship with it, s is an area of a single backlight partition, $b_i$ is a first backlight value for the $i^{th}$ first backlight partition, and n is the number of first backlight partitions that are in a partially overlapping relationship with the second backlight partition.

In some embodiments, the display controller is configured to: determine that the first region and the second region are non-overlapping regions when an area of the first region or the second region is smaller than an area of a single backlight partition, and obtain the backlight value of the backlight partition corresponding to the second region based on image data of the second region.

In some embodiments, the display device is a virtual reality VR device. The display controller is configured to obtain a first posture of the VR device corresponding to the first frame image and a second posture of the VR device corresponding to the second frame image; determine a pixel mapping relationship between the first frame image and the second frame image based on the first posture and the second posture; and determine the first region and the second region based on the pixel mapping relationship.

In some embodiments, the display controller is configured to obtain the first posture characterized by a first posture quaternion $Q_1$ and the second posture characterized by a second posture quaternion $Q_2$, determine a posture conversion relationship Q of the VR device based on the first posture quaternion $Q_1$ and the second posture quaternion $Q_2$ according to an equation: $Q = Q_2^{-1} * Q_1$. The display controller is further configured to obtain a coordinate conversion relationship M between a VR device coordinate system and an image field of view coordinate system, and determine a pixel mapping relationship T between the first frame image and the second frame image according to a following equation:

$$T = M^{-1}QM$$

where Q is a matrix form of the posture conversion relationship, and M is a matrix form of the coordinate conversion relationship.

In some embodiments, the display controller is further configured to map a first pixel in the first frame image to a corresponding second pixel under the second posture according to the pixel mapping relationship; determine that the first pixel and the second pixel belong to the overlapping region in response to the second pixel being within a range of the second frame image; and determine the first region and the second region respectively based on the first pixel and second pixel that belong to the overlapping regions.

In some embodiments, the image data is image data that has been compensated for the backlight value.

According to a further aspect, there is provided a non-transitory computer-readable storage medium which stores a computer program thereon, the computer program, when executed by a processor, implementing the steps of the method described above.

According to a further aspect, there is provided a computer device, comprising a memory, a processor, and a computer program stored on the memory and being runnable on the processor, wherein the processor, upon executing the computer program, implements the steps of the method stated above.

The display device and the driving method thereof according to the embodiments of the present disclosure may be used to obviously reduce the calculation amount in the local dimming of the backlight module, thereby alleviating occurrence of problems such as delay and freezing during the display and improving the user experience.

BRIEF DESCRIPTION OF THE DRAWINGS

The above and other objects, features and advantages of the present disclosure will be made more apparent after preferred embodiments of the present disclosure are described in detail with reference to figures.

DETAILED DESCRIPTION

Hereinafter, partial embodiments of the present disclosure will be described in detail with reference to the figures. Details and functions that are unnecessary for the present disclosure are omitted in the description to avoid causing confusion to the understanding of the present disclosure. In this specification, the following various embodiments for describing the principles of the present disclosure are merely illustrative and should not be construed as limiting the scope of the disclosure in any way. The following description with reference to the figures is provided to assist in thoroughly understanding exemplary embodiments of the present disclosure as defined by the claims and their equivalents. The following description includes various specific details to help understanding, but these details should be considered as being merely exemplary. Accordingly, those having ordinary skill in the art should recognize that various changes and modifications can be made to the embodiments described herein without departing from the scope and spirit of the present disclosure.

In addition, description of well-known functions and structures are omitted for the sake of clarity and conciseness. Furthermore, throughout the figures, the same reference numerals are used for the same or similar functions, devices, and/or operations. In the figures, various parts are not necessarily drawn to scale. In other words, relative sizes, lengths, etc. of the parts in the figures do not necessarily correspond to the actual proportions.

In the present disclosure, the terms "including" and "comprising" and their derivatives are intended to include, not to limit. The term "or" is inclusive, meaning "and/or". In addition, in the following description of the present disclosure, directional terms such as "up", "down", "left" and "right" and so on are used to indicate relative position relationships to assist those skilled in the art in understanding embodiments of the present disclosure. Therefore, those skilled in the art should understand that "up"/"down" in one direction may be changed to "down"/"up" in the opposite direction, and changed to other positional relationship such as "left"/"right" in another direction.

As used herein, the term "overlapping regions" may refer to regions in two frame images within which image contents are the same (namely, the image contents overlap). When two frame images are displayed on a display device, pixel data (e.g., gray and hue) for pixels in display regions of the display panel that correspond to respective "overlapping regions" in the two frame images are the same.

As used herein, "a backlight partition corresponding to a region in a frame image" may refer to a backlight partition in a backlight module that provides backlight for the region when the frame image is displayed, i.e., a backlight partition that corresponds to pixels for displaying the region. Here, "correspond" means that the backlight partition is taken as a main backlight source of these pixels. For example, the backlight partition may be the one that is arranged directly at the back side of these pixels.

In a conventional LCD display, the backlight module usually uses a direct-type or side-light type backlight technique. For example, in the side-light type backlight module, the backlight module of the LCD display is usually implemented by disposing a cold cathode fluorescent lamp (CCFL) on the side of the display as a light source to emit light, and diffusing the light via a light guide plate to the back of the entire display panel. However, as stated above, the light emission of such a backlight module can only be adjusted as a whole, and local light source cannot be adjusted for some pixels, so that the overall contrast is low and power consumption is high.

The local dimming technology is used to enhance the contrast of the LCD display. In the local dimming technology, a plurality of individually dimmable backlight units (for example, multiple light emitting diode (LED) light sources) are disposed in the backlight module, and the brightness of light emitted by a corresponding backlight unit may be regulated according to a grayscale of the pixels to be displayed. In this way, compared with the design using a single light source plus a light guide plate, the local dimming technology may achieve a higher contrast and reduce power consumption.

However, as the resolution of the LCD displays increases (for example, from 1080P to 2K, even 4K, 8K, etc.), the amount of calculation required to calculate the backlight value for local dimming increases exponentially. This causes a larger burden on display devices or electronic devices using this technology, especially on mobile devices with limited computing power and battery power.

Figure 1:
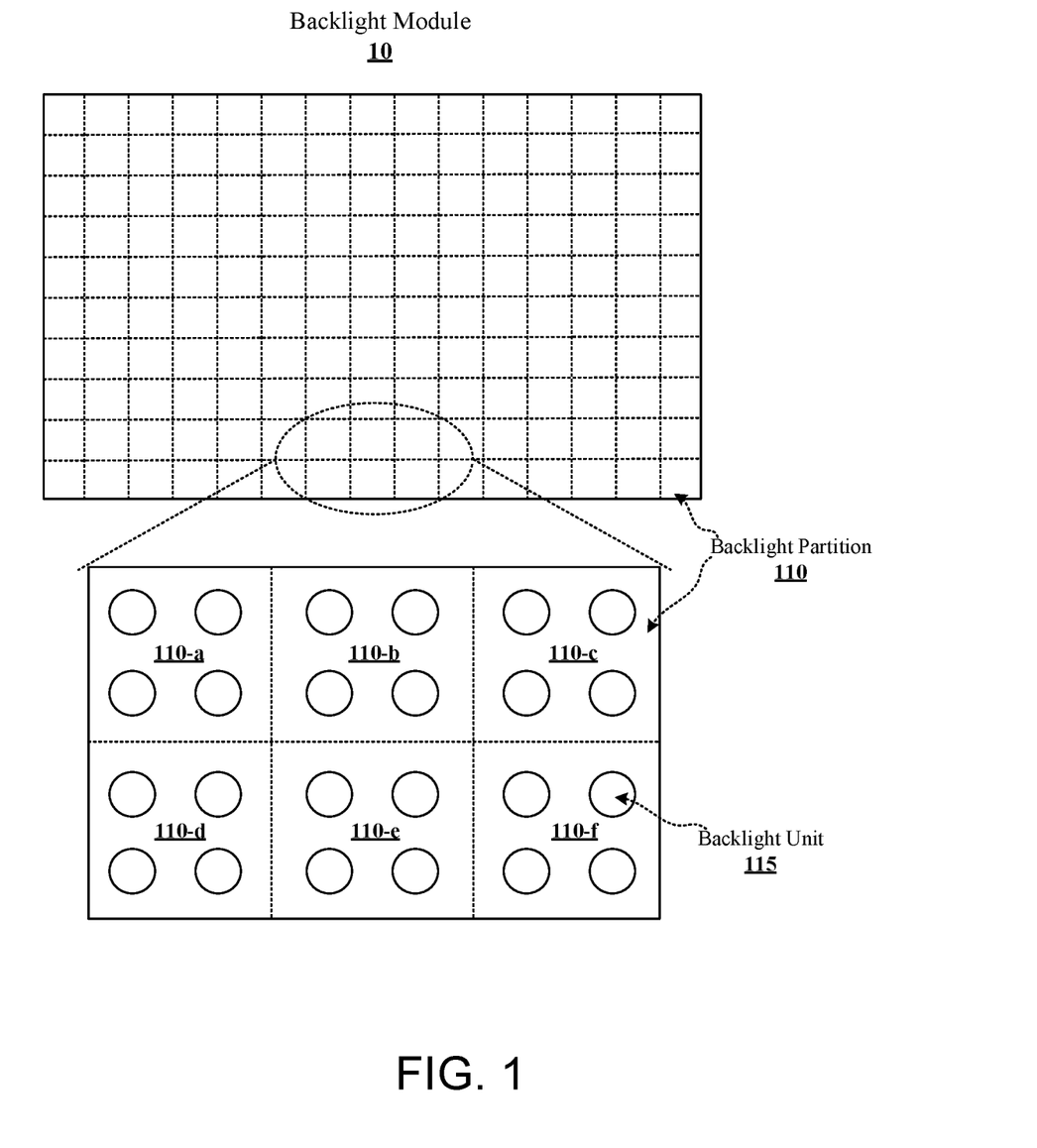
FIG. 1 is a schematic diagram illustrating an example configuration of a backlight module according to an embodiment of the present disclosure.

To this end, according to an embodiment of the present disclosure, an improved local dimming approach is provided. FIG. 1 is a schematic diagram illustrating an example configuration of a backlight module 10 according to an embodiment of the present disclosure.

As shown in FIG. 1, the backlight module 10 may be provided with a plurality of backlight partitions 110. One or more backlight units (for example, LED light sources) 115 may be disposed in each backlight partition 110. The backlight units 115 in the same backlight partition 110 may apply the same backlight value, and different backlight partitions 110 may apply mutually independent backlight values. For example, six backlight partitions 110-a~110-f are shown in the partial enlarged view below the example shown in FIG.

1. Four backlight units are provided in each backlight partition. The pixels corresponding to these backlight partitions may be enabled to display an appropriate grayscale by for example appropriately setting backlight values of the six backlight partitions 110-*a*~110-*f*, thereby achieving a higher contrast.

For example, when one or more pixels corresponding to the backlight partition 110-*a* are to display pure black, the backlight value of the backlight partition 110-*a* may be set to 0 for example so that it does not emit light. As another example, when one or more pixels corresponding to the backlight partition 110-*b* are to display pure white, the backlight value of the backlight partition 110-*b* may be set to 255 for example so that it emits light with the highest brightness. In this way, the contrast of the displayed picture may be improved by dividing the backlight module 10 into a plurality of individually-controllable backlight partitions 110. Moreover, power consumption may be reduced because the brightness of the corresponding backlight partition may be reduced when high brightness is not needed in some parts of the image.

In addition, in order to ensure that when each backlight partition 110 emits the dimmed backlight, the image displayed by the display device can produce an expected display effect (for example, grayscale), it might be necessary to compensate for the original image data so that the pixels, illuminated by the dimmed backlight, still present an expected image effect (e.g., grayscale). For example, for a plurality of pixels corresponding to a backlight partition 110, since the grayscale of its original image data might not be set for the locally-dimmed backlight, the grayscale of these pixels needs to be adjusted based on the original image data. For example, when the light emission amount of the backlight partition 110 decreases, the grayscale of the image data of the pixel is increased, or for example, when the light emission amount of the backlight partition 110 rises, the gray level of the image data of the pixel is decreased, thereby achieving the expected display effect.

It should be noted that although each backlight partition is illustrated as including a 2×2 backlight unit array in the context, embodiments of the present disclosure are not limited thereto. Instead, the backlight partitions may be divided in any suitable way. Furthermore, the shapes of the backlight partitions may not be limited to a regular geometric shape. For example, a central region of the screen where the user's attention is usually concentrated may be divided into a large number of small backlight partitions (for example, each backlight partition includes one backlight unit), and a peripheral region of the screen that draws less attention from the user may be divided into a small number of large backlight partitions. These large backlight partitions may each include a number of backlight units and may be for example in a shape of an elongated strip, a broken line, or other regular or irregular shapes. In addition, the number of backlight units included in each backlight partition is not limited to the example shown in FIG. 1, but may be set accordingly as needed.

In the following, a virtual reality VR device is taken as an example to describe the embodiments of the present disclosure in detail. However, those skilled in the art should understand that the application field of the present disclosure is not limited thereto. In fact, the display device and the driving method thereof according to the present disclosure may be applied to any other fields using the local dimming technology for a backlight module, such as a TV set, a desktop computer display, a smart phone, a tablet computer, a mobile terminal, etc.

As a type of LCD display devices, VR devices may also use the local dimming technology. However, it should be appreciated that because VR technology is used to simulate a virtual environment to provide users with an immersive environment, the image displayed by a VR device is usually generated by the VR device in real time according to the user's posture. However, in the case of using the local dimming technology to generate the backlight value for controlling a backlight module, a non-negligible delay is inevitably introduced into the VR rendering process. Therefore, a series of problems such as afterimages and freezes may be caused.

In particular, pictures displayed by a VR device to a user are usually generated according to the user's gestures/actions, etc., in order to simulate scenes observed by the user in real time. Due to the strong continuity of the user's gestures/actions, the scenes in the images displayed by a VR device are usually continuous. There will be a large number of regions overlapping with each other (i.e., with the same image contents) between the displayed adjacent frames or close frames (e.g., two frames separated by one frame, two frames or more frames). Experiments show that an overlapping portion between adjacent frames accounts for about 50% of the entire screen area when a user's movement speed is normal. When a user is stationary, the overlapping portion might even reach 100% since the adjacent frames display the same picture.

In an example scenario, when a user starts to observe the virtual world while wearing a VR helmet, the observed scene (i.e., the picture displayed to the user by the VR helmet) changes correspondingly with the movement of the user's head. For example, when the user's head turns from right to left, the object in the scene (for example, the box shown in FIG. 5) that he observes will move continuously from left to right in an opposite direction, and therefore the object is likely to exist in continuous multi-frame images displayed by the VR device. This causes overlapping regions to exist between adjacent frame images, namely, regions containing the same image contents, for example, the box shown in FIG. 5. As such, if there is an overlapping region in a certain frame corresponding to a certain region of a preceding frame, the corresponding backlight value of that region in the preceding frame may be directly or indirectly used for a backlight partition corresponding to the overlapping region, without calculating the backlight value for the backlight partition.

Figure 2:
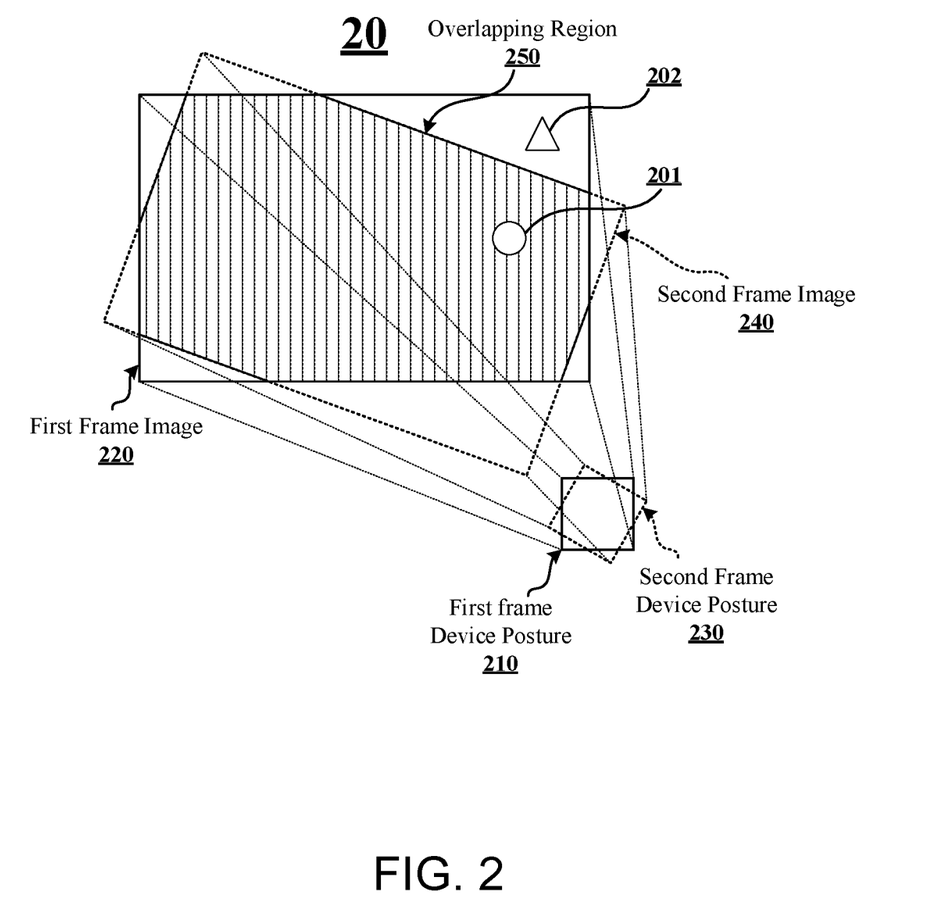
FIG. 2 is a schematic diagram illustrating displaying two frame images with a virtual reality (VR) device according to an embodiment of the present disclosure.

On some occasions, since a posture of a VR device (such as a VR headset) changes with a user's posture, the VR device may detect its own posture through, for example, a sensor (such as a motion sensor) to represent the user's posture. FIG. 2 shows two frame images corresponding to two postures of a VR device 20, which simulate two pictures observed when a user performs different postures. It should be noted that in VR device, a display is usually set for each of the left right and right eye of the user and displays slightly different pictures to cause parallax, so that the user can perceive stereoscopic vision. However, for brevity of the description herein, only one display and corresponding user view angle (or referred to as a device posture) are shown in the embodiment. Therefore, in fact displayers for the left eye and/or the right eye may use the embodiment of the present disclosure separately or collectively.

In FIG. 2, two boxes are used to represent two frames images which are displayed to the user by the VR device, and correspond to scenes that may be observed by the user. As shown in FIG. 2, when the user's head is upright, a first frame image 220 represented by a solid-line box will be displayed to the user. A first frame device posture 210 representing that the VR device is upright corresponds to the first frame image. When for example the user's head tilts rightward, the picture observed by him will also tilt accordingly, so a second frame image 240 represented by the tilted dotted-line box will be displayed to the user. A second frame device posture 230 representing that the VR device is tilted corresponds to the second frame image. It can be seen that in a VR scenario, the relationship between the first frame image 220 and the second frame image 240 (e.g., changes of positions of image regions containing the same image contents in these images) may only be affected by the relationship between the first frame device posture 210 and the second frame device posture 230.

In FIG. 2, there are overlapping regions between the first frame image represented by the solid-line box and the second frame image represented by dotted-line box. The overlapping region is marked with hatched lines, and indicates the image regions in the two frame images that correspond to the same scene.

As shown in FIG. 2, after the VR device posture changes from a first device posture to a second device posture, the position of a circular object 201 in the second frame image is closer to the upper edge of the box than the position of the circular object 201 in the first frame image. Nevertheless, since the position of the circular object is still within the second frame image and thus it is still visible to the user, it may be determined that the region it covers belongs to an overlapping region. Meanwhile, after the VR device posture changes, the position of a triangular object 202 in the first frame image 220 already goes beyond the scope of the second frame image and therefore the triangular object 202 is invisible to the user. It may then be determined that the region triangular object covers does not belong to an overlapping region. Regarding the overlapping regions in the two frame images, since they have the same image contents, the pixel data corresponding thereto is the same. As such, the same or similar display parameters including backlight values for the backlight module may be employed for overlapping regions in the two frame images.

Therefore, a general concept of some embodiments of the present disclosure lies in trying to utilize previously-obtained backlight values by leveraging the continuity of displayed pictures, namely, image correlation between the displayed pictures, thereby reducing the calculation amount used to calculate backlight values.

According to some embodiments of the present disclosure, a local dimming approach based on adjacent frame optimization is proposed. According to the approach, an overlapping portion in two frame images (e.g., a current frame image and its preceding frame image) having the same image contents may be determined using image similar properties between adjacent frames and through the correlation between the adjacent frames. Since the image contents/image data to be displayed in the overlapping portion of the two frame images are the same, the same backlight data or backlight value may be employed for backlight partitions corresponding to the overlapping portion. As such, the backlight data corresponding to the overlapping portion in the current frame may be easily obtained based on the backlight data corresponding to the overlapping portion in the preceding frame. Experiments show that for a VR device, because an overlapping portion between adjacent frames accounts for about 50% of the total in the case that the user's movement speed is normal, it may save about 20% of the calculation amount. When the user is stationary, the calculation amount may be saved by about 50%. The efficiency of backlight control is improved by reducing the calculation amount for local dimming. In this way, phenomenon such as delay, freezing and afterimage during the display may be reduced.

Figure 3:
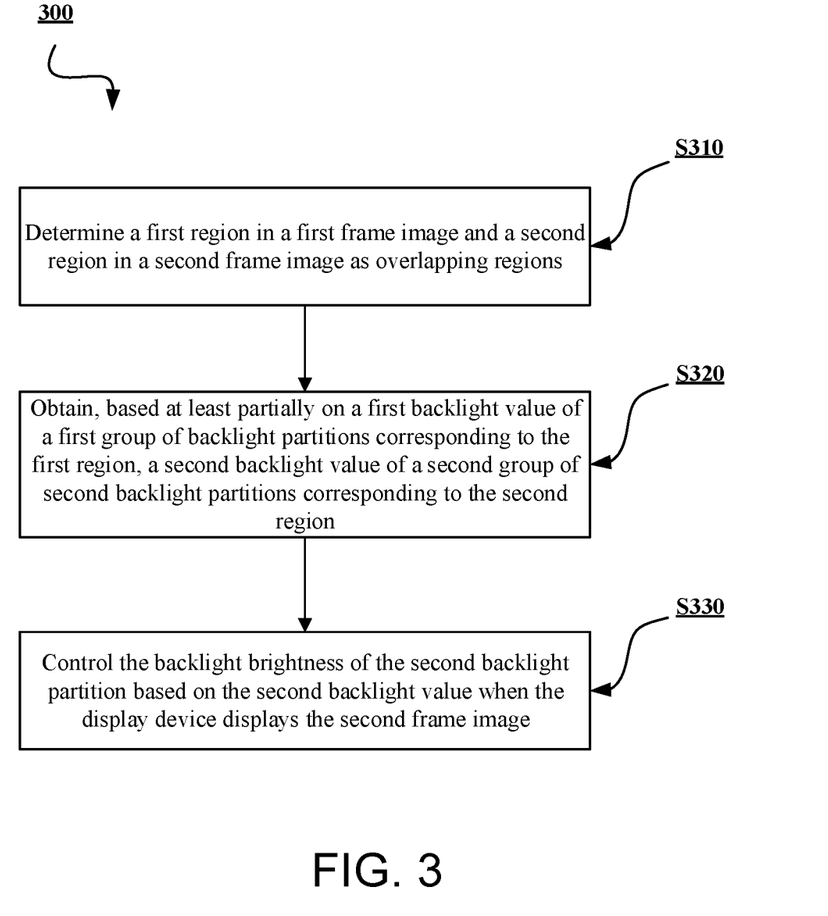
FIG. 3 is a flowchart illustrating an example method for driving a display device according to an embodiment of the present disclosure.

FIG. 3 is a flowchart illustrating an example method 300 for driving a display device according to an embodiment of the present disclosure. The display device may be any electronic device having a display function and configured to display consecutive multi-frame images in an image sequence. The image sequence at least includes a first frame image and a second frame image. The display device comprises a backlight module, which includes a plurality of backlight partitions. Exemplarily, the display device may be a VR device such as a VR helmet. The method 300 may be performed by a display device, or by another device other than the display device.

At step S310, a first region in the first frame image and a second region in the second frame image corresponding to an overlapping portion between the first frame image and second frame image are determined as overlapping regions. The first frame image and the second frame image may be adjacent frames or close frames (e.g., two frames with one frame, two frames or more frames in between) in the image sequence (e.g., video) to be displayed by the display device. In an example scenario of the VR device, the first frame image and the second frame image may be two frame images before and after the VR device posture changes respectively.

In some embodiments, since images displayed by the VR device change with postures of the user (namely, the wearer of the VR device), the overlapping regions of the first frame image and the second frame image may be determined based on the changes of the user's posture/VR device posture.

In one example, a quaternion may be used to describe the posture of the VR device and its rotation. The quaternion is a mathematical concept that may be used to describe an object's posture and its rotation. For example, a quaternion $q=s+xi+yj+zk$ may have three ordinal units i, j and k, and is usually referred to as a four-dimensional array [s, x, y, z]. An advantage of the quaternion is that the description of continuous rotation of the object may be implemented through simple multiplication. For example, given a posture quaternion p, the posture quaternion after rotation may be expressed as a product of the posture quaternion p multiplied by another unit quaternion q on the left and multiplied by the inverse $q^{-1}$ of the unit quaternion on the right: $qpq^{-1}$.

Returning to FIG. 2, assuming that the posture quaternion of a first frame VR device posture 210 is $Q_1$ and the posture quaternion of a second frame VR device posture 220 in the second frame is $Q_2$, a posture conversion relationship of the VR device 20 between the two frames is $Q=Q_2^{-1}*Q_1$, where $Q_2^{-1}$ is an inverse of $Q_2$, which represents a rotation opposite to that of $Q_2$.

In some embodiments, a pixel mapping relationship between the first frame image and the second frame image may be determined based on a first posture of the VR device corresponding to the first frame image and a second posture of the VR device corresponding to the second frame image; and the first region of the first frame image and the second region of the second frame image may be determined as the overlapping regions based on the pixel mapping relationship.

The existence of the overlapping regions between two frame images means that, for a first pixel in the overlapping region (i.e., the first region) in the first frame image, one can always find a corresponding second pixel in the second frame image for it. Therefore, in some embodiments, each first pixel in the first frame image may be mapped according to a pixel mapping relationship to obtain a mapped pixel. The mapped pixel corresponds to the second posture of the VR device. Determination is made as to whether the mapped pixel is within the range of the second frame image. If the second pixel is within the range of the second frame image, it is determined that the first pixel and the second pixel belong to overlapping regions. The first pixels and the second pixels belonging to the overlapping regions constitute the first region and the second region, respectively.

Figure 4A:
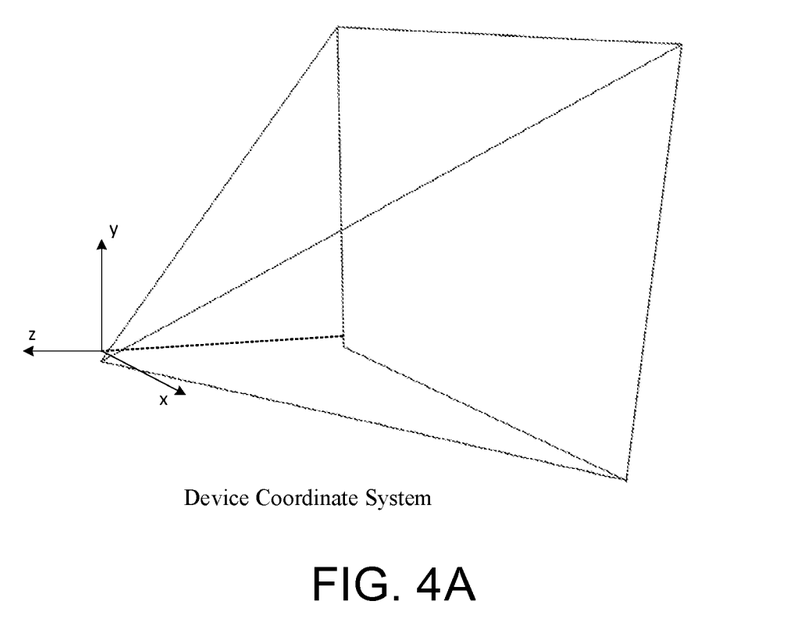
FIG. 4A and FIG. 4B are schematic diagrams respectively showing a VR device coordinate system and an image field of view coordinate system according to an embodiment of the present disclosure.
Figure 4B:
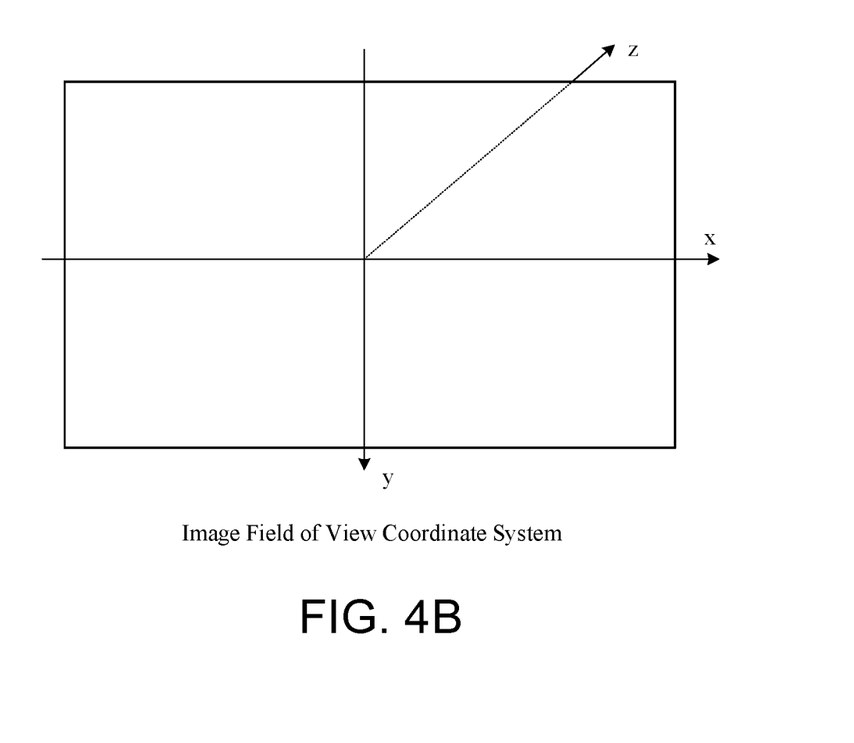

In some embodiments, a device coordinate system and an image field of view coordinate system may be established for a VR device and a user's field of view, respectively, to describe the posture changes of the VR device and the orientation changes of an object in the user's field of view. Therefore, in some embodiments, the overlapping regions between two frame images may be determined by virtue of a conversion relationship between the VR device coordinate system and the image field of view coordinate system. FIG. 4A and FIG. 4B are schematic diagrams respectively showing a VR device coordinate system and an image field of view coordinate system according to an embodiment of the present disclosure. As shown in FIG. 4A and FIG. 4B, it is assumed that in the VR device coordinate system and the image field of view coordinate system, the positive direction of x-axis is the same, but the positive directions of the y-axis and z-axis are actually opposite respectively in the two coordinate systems. As such, it is necessary to introduce a conversion matrix $$M = \begin{bmatrix} 1 & 0 & 0 \\ 0 & -1 & 0 \\ 0 & 0 & -1 \end{bmatrix}$$

between the coordinate systems. However, it would be appreciated that the present disclosure is not limited thereto. In some embodiments, other conversion matrixes may also be employed according to different coordinate conversion manners or coordinate direction arrangements.

In some embodiments, given the first and second VR device postures corresponding to the first frame image and the second frame image, and the conversion relationship between the VR device coordinate system and the image field of view coordinate system, the pixel mapping relationship between a pixel in the first frame image and its corresponding pixel (if any) in the second frame image may be obtained. Exemplarily, the pixel mapping relationship T between the first frame image and the second frame image may be expressed by the following Equation (1) and Equation (2):

$$T = M^{-1}QM \quad (1)$$

$$Q = Q_2^{-1} * Q_1 \quad (2)$$

where M is a matrix expression form of the conversion relationship between the VR device coordinate system and the image field of view coordinate system, $Q_1$ is a quaternion characterizing a first VR device posture corresponding to the first frame image, and $Q_2$ is a quaternion characterizing a second VR device posture corresponding to the second frame image, and Q is a matrix form of the posture conversion relationship.

Through the above Equation (1), coordinates of each pixel in the first frame image may be converted into coordinates of a corresponding pixel in the second posture. In some embodiments, after the VR device posture changes, coordinates of the pixel after the pixel mapping may be calculated for each pixel in the first frame image.

If the position of a corresponding pixel calculated for the first pixel goes beyond the range of the second frame image, this indicates that the first pixel does not have a corresponding second pixel in the second frame image, that is, it does not belong to an overlapping portion of the two frame images. This corresponds to the case of the triangular object 202 in FIG. 2 for example. Conversely, if the calculated position of the corresponding pixel is within the range of the second frame image, it indicates that the first pixel has a corresponding second pixel in the second frame image, and then belongs to the overlapping portion. This corresponds to the case of the circular object 201 in FIG. 2 for example. In such an embodiment, a set of first pixels having corresponding second pixels constitutes a first region in the first frame image, whereas a set of the corresponding second pixels constitutes a second region in the second frame image. The first region and the second region are the overlapping regions between two frames images.

Figure 5:
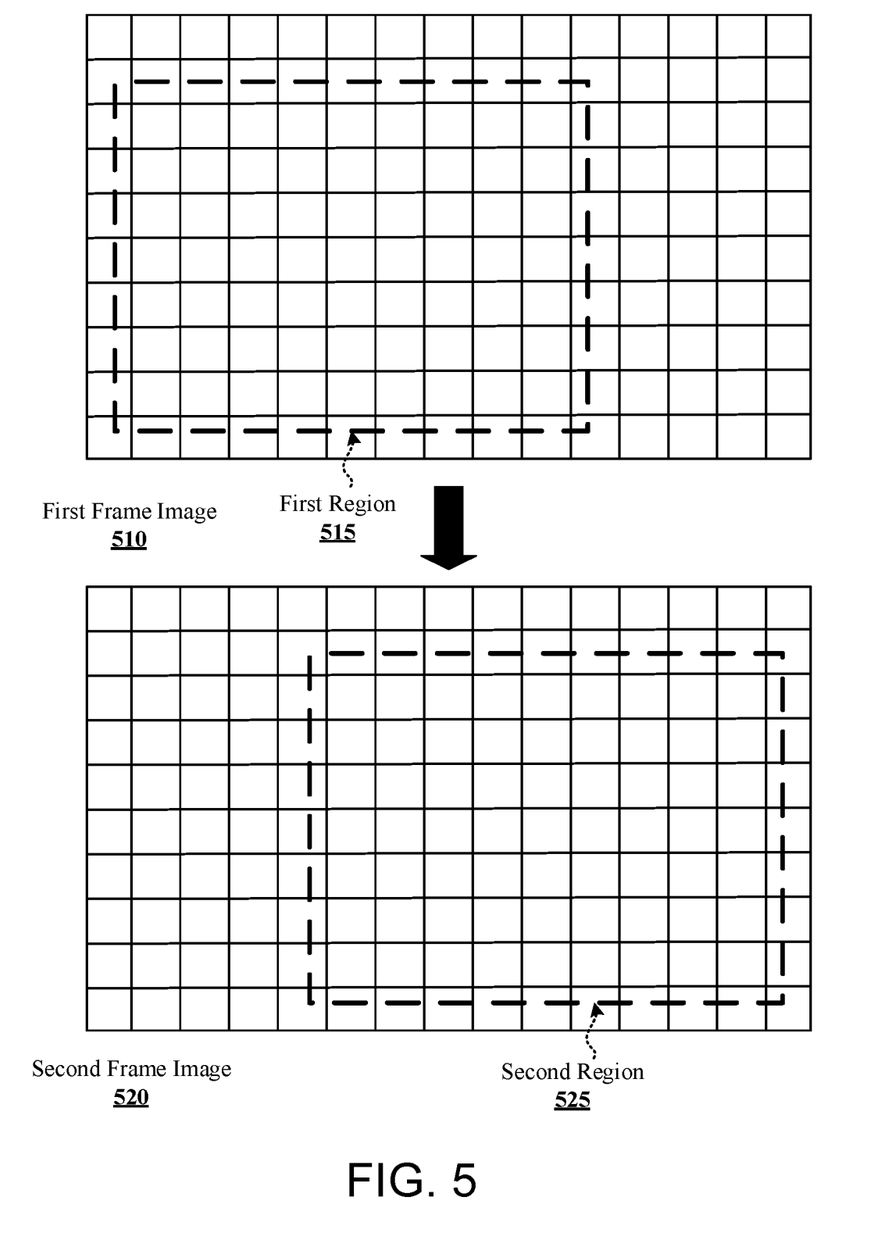
FIG. 5 is a schematic diagram illustrating an example overlapping region in two frame images according to an embodiment of the present disclosure.

FIG. 5 illustrates overlapping regions in two frame images according to an embodiment of the present disclosure. In FIG. 5, a first region 515 in a first frame image 510 and a second region 525 in a second frame image 520 are overlapping regions corresponding to each other. In other words, the first region and the second region, namely, the overlapping regions, actually display image portions having the same image data. The situation shown in FIG. 5 may occur, for example, when the user's head (that is, the posture of the VR device) turns from right to left, whereupon an object in the picture observed by a user is translates from left to right. The first frame image 510 corresponds to the first VR device posture, and the second frame image 520 corresponds to the second VR device posture. Since the second VR device posture turns to the left relative to the first VR device posture, the first region 515 near the left side of the image field of view in the first frame image 510 moves to the right and is rendered as a second region 525 near the right side of the image field of view in the second frame image 520. As stated above, the pixel mapping relationship between the first frame image 510 and the second frame image 520 may be determined according to the change in the posture of the VR device (i.e., the VR device posture) worn by the user. Furthermore, according to the pixel mapping relationship, whether there is an overlapping portion between the two frame images may be determined and the positions of the overlapping portion in the first frame image and the second frame image may be determined.

In some embodiments, after it is determined whether all pixels in the first frame image belong to an overlapping portion, a connected region may be constructed for all pixels which are determined as belonging to the overlapping portion. Optionally, in a case that the area of a certain connected region is smaller than a specific threshold, it may be determined that the connected region is not an overlapping region. For example, when the area of a certain connected region is smaller than that of a single backlight partition, it is determined that the connected region is not an overlapping region. At this time, its backlight value is not determined according to a backlight value of a backlight partition of the first frame image. In contrast, when the area of the connected region is greater than or equal to a specific threshold, such as the area of a single backlight partition, it is determined that the connected region is an overlapping region. Exemplarily, the area of a connected region may be determined based on the number of pixels it contains.

Although the embodiment in which the overlapping region is determined using the device posture is described above, the present disclosure is not limited thereto. In other embodiments, any other suitable method may also be used to determine the overlapping regions between the two frame images. For example, in some embodiments, the overlapping regions may be determined according to a motion trajectory of an observed object when scenes are generated. Alternatively, in other embodiments, each frame image may be divided into a plurality of partitions. The overlapping partitions between the two frame images may be determined by measuring the similarity between the partitions of the first frame image and the partitions of the second frame image, and in turn the overlapping region between the two frame images may be located based on the determined overlapping partitions.

At step S320, a second backlight value of a second backlight partition corresponding to the second region is obtained based at least partially on the first backlight value of one or more first backlight partitions corresponding to the first region.

In some embodiments, the first region and the second region are determined as the overlapping regions only when the area of the first region and the second region (i.e., the overlapping portion between the two frame images) is greater than or equal to that of a single backlight partition. In some embodiments, the first region and the second region may each correspond to a plurality of first backlight partitions and a plurality of second backlight partitions. For example, in a scenario where an object in a picture shown in FIG. 5 translates, the number of first backlight partitions corresponding to the first region 515 and the number of second backlight partitions corresponding to the second region 525 may be the same, and the first backlight partitions may correspond one to one with the second backlight partitions. In such a scenario, there is a first backlight partition that is in a fully overlapping relationship with a corresponding second partition, and then the first backlight value of the first backlight partition may be directly used as the second backlight value of the corresponding second backlight partition.

In some embodiments, one second backlight partition may correspond to multiple first backlight partitions. In such an embodiment, for the second backlight partition, its second backlight value may be calculated as follows: determine area occupation ratios in the second backlight partition for respective first backlight partitions which are in a partially overlapping relationship with the second backlight partition, and determining the second backlight value of the second backlight partition based on the first backlight values and the corresponding area occupation ratios of the first backlight partitions.

Figure 6:
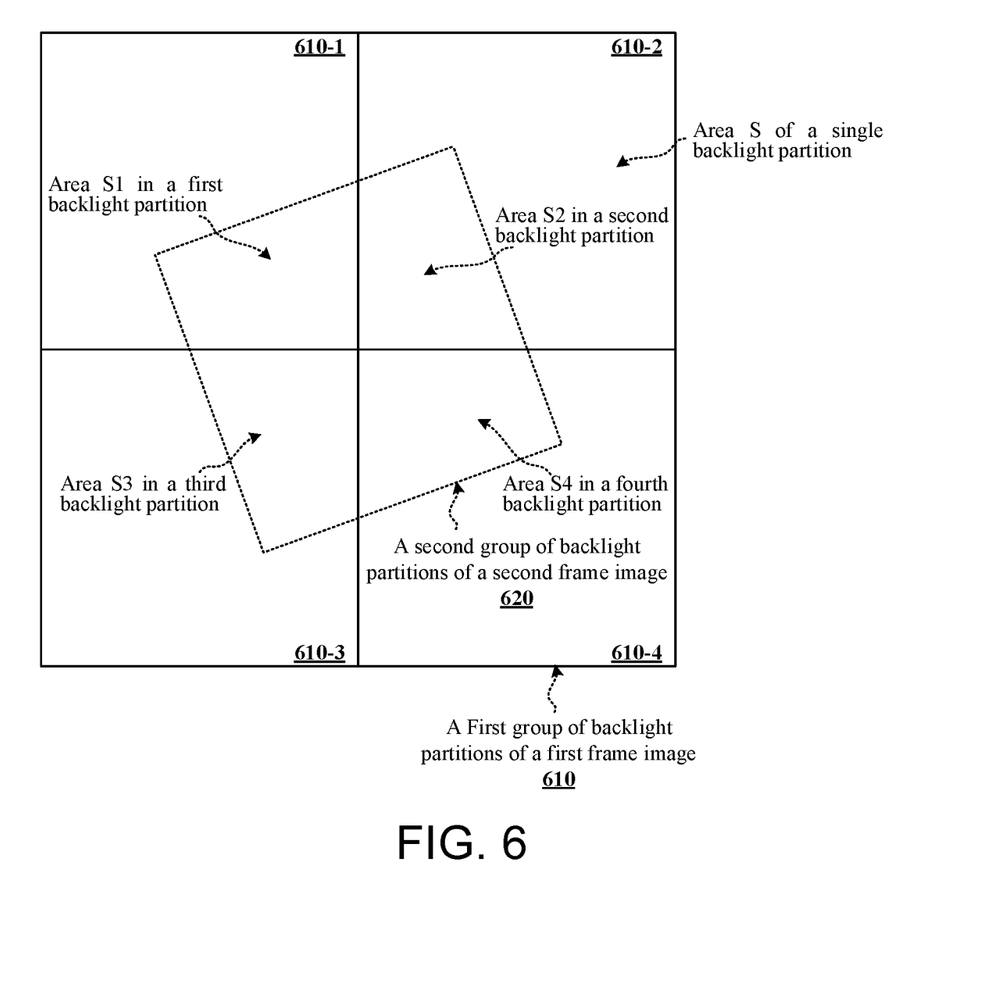
FIG. 6 is a schematic diagram illustrating backlight partitions corresponding to an overlapping region of two frame images according to an embodiment of the present disclosure.

FIG. 6 is a schematic diagram illustrating a correspondence relationship between first backlight partitions of a first frame image and a second backlight partition of a second frame image in overlapping regions according to an embodiment of the present disclosure. In FIG. 6, a first group of backlight partitions 610 of the first frame image is shown by solid-line boxes, which includes four first backlight partitions 610-1, 610-2, 610-3 and 610-4. In FIG. 6, a second group of backlight partitions 620 is shown with a dotted-line box, which includes one second backlight partition 620-1. As shown in FIG. 6, the backlight partition 620-1 of the second frame image corresponds to portions of the four backlight partitions 610-1, 610-2, 610-3 and 610-4 of the first frame image.

According to the embodiment of the present disclosure, the backlight value of the second backlight partition in the overlapping region of the second frame image may be calculated according to the following equation (3):

$$B = \sum_{i=1}^{n} \left( \frac{s_i}{s} \times b_i \right) \tag{3}$$

where B is the second backlight value of the second backlight partition for the second frame image, $s_i$ is an overlapping area of the second backlight partition with a $i^{th}$ first backlight partition that is in a partial overlapping relationship with it, s is an area of a single backlight partition, for example the second backlight partition, $b_i$ is a first backlight value for the $i^{th}$ first backlight partition of the first frame image, and n is the number of the first backlight partitions that are in a partial overlapping relationship with the second backlight partition.

In FIG. 6, the overlapping area of backlight partition 620-1 with the upper-left backlight partition 610-1 is $s_1$, the overlapping area of backlight partition 620-1 and an upper-right corner backlight partition 610-2 is $s_2$, the overlapping area of backlight partition 620-1 and a lower-left corner backlight partition 610-3 is $s_3$, and the overlapping area of backlight partition 620-1 and a lower-right corner backlight partition 610-4 is $s_4$. Exemplarily, the respective overlapping areas may be calculated by dividing respective overlapping portions of backlight partition 620-1 and the backlight partitions 610-$i$ into two triangles, respectively. The area of backlight partition 620-1 is s. Therefore, the area occupation ratios of the backlight partitions 610-$i$ in the backlight partition 620-1 are $$\frac{s_1}{s}, \frac{s_2}{s}, \frac{s_3}{s}$$

and $s_4/s$, respectively. Taking the area occupation ratios as light emission ratios of respective backlight partitions 610-$i$, the backlight value of the backlight partition 620-1 may be determined as $$B = \sum_{i=1}^{4} \left( \frac{s_i}{s} \times b_i \right).$$

It should be noted that the present disclosure is not limited to such a method for determining a backlight value. In some other embodiments, when a backlight partition 620-1 of the second frame image corresponds to a plurality of backlight partitions 610-$i$ of the first frame image, a maximum backlight value or a minimum backlight value of the backlight partitions 610-$i$ may also be selected as the backlight value of the backlight partition 620-1, or the backlight value of the backlight partition 620-1 is determined as an average value, a median etc. of the backlight values of the backlight partitions 610-$i$. This will further simplify the calculation of the backlight value of the second frame image, thereby further reducing the computational complexity.

Although FIG. 6 shows that a single backlight partition in the second frame image overlaps with four backlight partitions in the first frame image, the present disclosure is not limited thereto. In other embodiments, a single backlight partition in the second frame image may overlap with a single backlight partition, two backlight partitions or three backlight partitions or any other number (e.g., in the case that the backlight partitions have other regular or irregular shapes) of backlight partitions in the first frame image. The manner of calculating the backlight value may also be adjusted correspondingly according to a mapping relationship between corresponding backlight partitions in overlapping regions of the first frame image and the second frame image.

According to the embodiment of the present disclosure, for backlight partitions corresponding to regions other than the overlapping region in the second frame image, their backlight value may be obtained based on image data of the other regions in the second frame image.

In some embodiments, if the area of the first region and the second region is smaller than the area of a single backlight partition, it is determined that the second region does not belong to the overlapping region, and the second backlight value of its corresponding backlight partition is determined based on the image data of the second frame image.

At step S330, the backlight brightness of the second backlight partition is controlled based on the obtained second backlight value when the display device displays the second frame image.

According to the approach of the embodiment of the present disclosure, since a backlight value of a backlight partition corresponding to a region in the second frame image that overlaps the first frame image may be obtained in a simple manner, the computation complexity of the backlight value is reduced on the whole, thereby speeding up the setting of backlight values during the local dimming and avoiding the delay in the image display process. This makes it possible to provide a better user experience.

Figure 7:
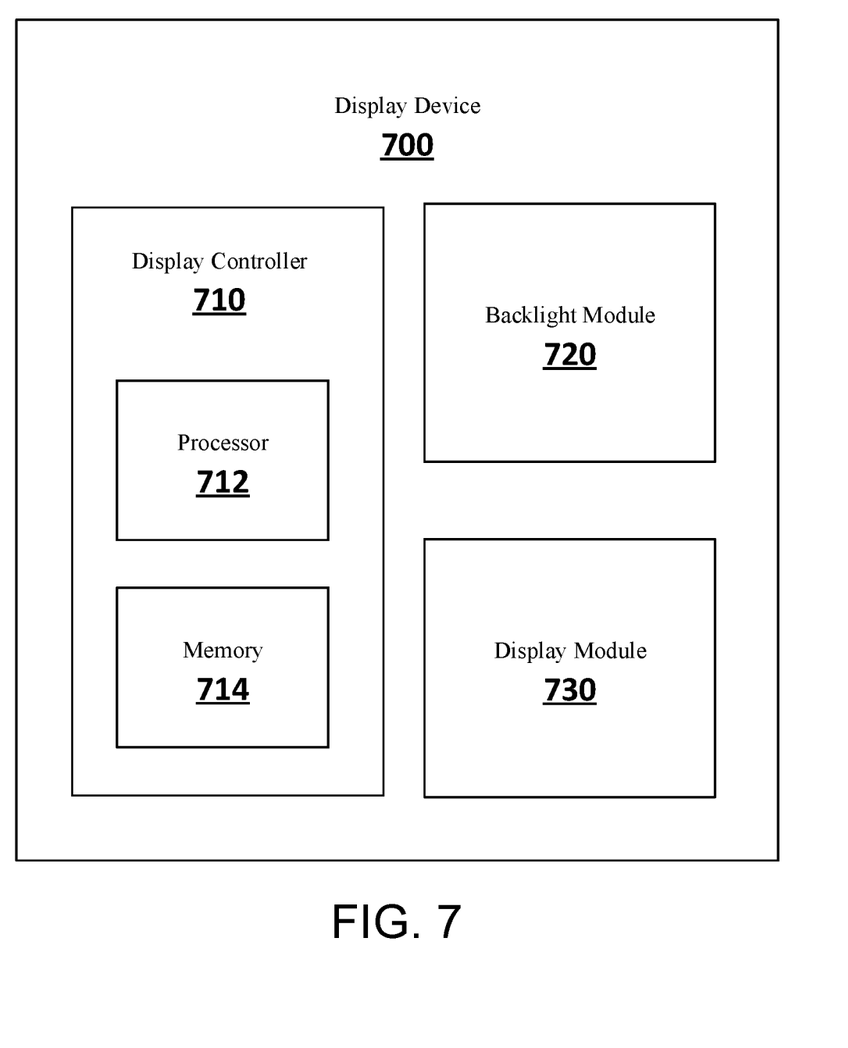
FIG. 7 is a schematic diagram illustrating an example configuration of a display device according to an embodiment of the present disclosure.

FIG. 7 is a schematic diagram illustrating an example configuration of a display device 700 according to an embodiment of the present disclosure. As shown in FIG. 7, the display device 700 may include a display controller 710, a backlight module 720 and a display module 730. It should be noted that the embodiment shown in FIG. 7 is only for illustrating the present disclosure, and therefore does not impose any limitation on the present disclosure. In fact, the display device 700 may include more, fewer, or different components, and it may be a separate device or a distributed device distributed at multiple places. For example, the display device 700 may be, for example, but not limited to, an LCD display, a smart phone, a mobile terminal, a smart watch, a VR device, such as a VR helmet and the like.

The display controller 710 may be a component responsible for the overall control of the display device 700, and may be communicatively connected with other modules/components to receive to-be-processed data and/or instructions from other modules/components and send processed data and/or instructions to other modules/components. In some embodiments, the display controller 710 may include a processor 712 and a memory 714. The processor 712 may be, for example, a general-purpose processor such as a Central Processing Unit (CPU), a Digital Signal Processor (DSP), an Application Processor (AP), etc. In this case, it may perform one or more steps of the method according to embodiments of the present disclosure under instruction of an instruction/program/code stored in the memory 714. In addition, the display controller 710 may also be for example a special purpose processor, such as an Application Specific Integrated Circuit (ASIC), a Field Programmable Gate Array (FPGA), or any other hard-coded or hard-wired logic device.

In this case, it may specifically perform one or more steps of the above method according to embodiments of the present disclosure according to its circuit design. In addition, the display controller 710 may also be any combination of hardware, software and/or firmware. In addition, although only one display controller 710 is shown in FIG. 7, the display controller 710 may in fact include a plurality of processing units distributed at a plurality of locations.

In one example, in a case where the display device 700 is a VR helmet, the display controller 710 may be a main controller provided in the VR helmet, and it may control the backlight value of the backlight module according to image data which received from an external device and to be displayed by the VR helmet. The display controller 710 may drive the VR helmet to display the image data by calculating the backlight value according to the approaches of embodiments of the present disclosure. The calculation of backlight values of the backlight module 720 may include calculating the backlight values using the pixel mapping relationship of the overlapping regions of adjacent frames, or may include calculating the backlight values separately based on image data of respective frames.

In another example, in the case where the display device 700 is a stand-alone LCD display, the processor 712 may be a controller or a microcontroller provided in the LCD display, which is hard-coded to perform one or more steps of the method according to embodiments of the present disclosure.

The memory 714 may be configured to temporarily or persistently store computer-executable instructions. The computer-executable instructions, when executed by the processor 712, may cause the processor 712 to perform one or more steps of the method according to embodiments of the present disclosure. In addition, the memory 714 may also be configured to temporarily or persistently store data related to backlight value calculation, such as image data of one or more frames, backlight values corresponding to the one frame image data or multiple frame image data, and so on. The memory 714 may include a volatile memory and/or a non-volatile memory. The volatile memory may include, for example (but not limited to): Dynamic Random Access Memory (DRAM), Static RAM (SRAM), Synchronous DRAM (SDRAM), cache, and so on. The non-volatile memory may include, for example (but not limited to): One-Time Programmable Read-Only Memory (OTPROM), Programmable ROM (PROM), Erasable Programmable ROM (EPROM), Electrically Erasable Programmable ROM (EEPROM), mask ROM, flash ROM, flash memory (e.g., NAND flash memory, NOR flash memory, etc.), hard disk drive or Solid State Drive (SSD), Compact Flash (CF), Secure Digital (SD), micro SD, mini SD, Extreme Digital (xD), Multimedia Card (MMC), memory stick, etc. In addition, the memory 714 may also be a remote storage device, such as a Network Attached Storage (NAS). The memory 714 may also include a distributed storage device, such as cloud storage, distributed at multiple locations.

The backlight module 720 may be for example an LED backlight module, and may be divided into a plurality of backlight partitions of which light emission may be controlled independently of each other. The backlight module 720 may provide proper backlight for corresponding pixels in the display module 730 under control of the display controller 710 to implement the local dimming function, thereby achieving better contrast and reducing power consumption.

The display module 730 may be for example an LCD display module, and may collaboratively work with the backlight module 720 to implement the display of images under control of the display controller 710. In order to ensure that the backlight module 720 and the display module 730 can work synchronously, the display controller 710 may for example trigger the generation of a vertical synchronization signal (Vsync). When the vertical synchronization signal is detected, the respective backlight partitions of the backlight module 720 may emit light under the driving of respective backlight values, and meanwhile the display module 730 may display the corresponding images under the driving of the corresponding image data. For example, the vertical synchronization signal may be for example a periodic pulse generated by a display driver in the display module 730, for example.

In addition, the display device 700 may further include other modules, including (but not limited to): a power supply module, a GPS module, a sensor module (for example, a proximity sensor, an illumination sensor, an acceleration sensor, a gyroscope sensor, a fingerprint sensor, etc.), and the like. In some embodiments, the sensor module may generate sensor data indicating a display device posture, such as a VR device posture. This sensor data may be used to determine the display device posture. Additionally or alternatively, the display device may also receive, from an external device, sensed data that characterizes the device posture.

It should be noted that the above-mentioned modules are only some examples of the modules that the display device 700 may include, and the display device according to the embodiments of the present disclosure is not limited thereto. In other words, the display device according to other embodiments of the present disclosure may include more modules, fewer modules, or different modules.

In some embodiments, the electronic device 700 shown in FIG. 7 may perform each step of the method according to embodiments of the present disclosure described with reference to FIG. 2 to FIG. 6.

While certain embodiments are described herein, other embodiments are available, and the described embodiments should not be used to limit the claims. An electronic device may include any device that instructs a computer system or device to perform steps in a method, for example, include a system composed of a processing unit and various arithmetic logic circuits coupled to a computer memory, the system having the ability to store in the computer memory, The computer memory includes an electronic circuit configured to store data and program instructions. An exemplary computer program product can be used together with any suitable data processing system. Although a certain number and types of modules or components have been described above, it may be appreciated that other numbers and/or types and/or structures may be included according to various embodiments. Therefore, according to the desired implementation, a component function may be further divided and/or be combined with other component functions.

Furthermore, various operations of the embodiments are provided herein. In one embodiment, one or more of the operations described may constitute computer-readable instructions stored on one or more computer-readable media. The computer-readable instructions, when executed by a computing device, cause the computing device to perform the described operations. The order in which some or all operations are described should not be construed as implying that these operations certainly depend on the order. Those skilled in the art who have the benefit of this description will realize alternative orderings. In addition, it will be understood that not all operations are necessarily present in every embodiment provided herein.

In addition, unless specified otherwise, "first" and/or "second" and the like are not intended to imply a temporal aspect, a spatial aspect, an ordering, etc. Rather, such terms are merely used as identifiers, names, etc. for features, elements, items, etc. For example, a first object and a second object generally correspond to object A and object B, or two different objects.

In addition, a function or module described herein as being implemented by pure hardware, pure software and/or firmware may also be implemented by dedicated hardware, or a combination of general-purpose hardware and software. For example, a function or module described as being implemented by dedicated hardware (e.g., Field Programmable Gate Array (FPGA), Application Specific Integrated Circuit (ASIC), etc.) may be implemented by a combination of general-purpose hardware (e.g., Central Processing Unit (CPU), Digital Signal Processor (DSP)) and software, and vice versa.

The disclosure has been described above in conjunction with the preferred embodiments. It should be appreciated that those skilled in the art can make various other changes, substitutions and additions without departing from the spirit and scope of the present disclosure. Therefore, the scope of the present disclosure is not limited to the specific embodiments described above, but should be defined by the appended claims.

The invention claimed is:

1. A method for driving a display device to display an image sequence, the display device comprising a backlight module having a plurality of backlight partitions, the image sequence comprising at least a first frame image and a second frame image, the method comprising:
   determining a first region in the first frame image and a second region in the second frame image as overlapping regions, the first region and the second region corresponding to an overlapping portion between the first frame image and second frame image;
   obtaining, based at least partially on a first backlight value of one or more first backlight partitions corresponding to the first region, a second backlight value of a second backlight partition corresponding to the second region; and
   controlling a backlight brightness of the second backlight partition based on the second backlight value when the display device displays the second frame image.

2. The method according to claim 1, wherein the first frame image and the second frame image are adjacent frames in the image sequence, and the determining the first region in the first frame image and the second region in the second frame image as overlapping regions comprises: determining the first region and the second region as the overlapping regions only when areas of the first region and the second region are greater than or equal to an area of a single backlight partition.

3. The method according to claim 2, wherein the obtaining the second backlight value of the second backlight partition corresponding to the second region comprises:
   determining area occupation ratios in the second backlight partition for multiple first backlight partitions which are in a partially overlapping relationship with the second backlight partition; and
   determining the second backlight value of the second backlight partition based on first backlight values of the multiple first backlight partitions and their respective area occupation ratios.

4. The method according to claim 3, wherein the obtaining the second backlight value of the second backlight partition comprises calculating the second backlight value according to a following equation:

$$B = \sum_{i=1}^{n}\left(\frac{s_i}{s} \times b_i\right)$$

where B is the second backlight value of the second backlight partition, $s_i$ is an overlapping area of the second backlight partition with a $i^{th}$ first backlight partition that is in a partially overlapping relationship with it, s is an area of a single backlight partition, $b_i$ is a first backlight value for the $i^{th}$ first backlight partition, and n is the number of first backlight partitions that are in a partially overlapping relationship with the second backlight partition.

5. The method according to claim 1, wherein the determining the first region in the first frame image and the second region in the second frame image as the overlapping regions comprises:
determining that the first region and the second region are non-overlapping regions when areas of the first region and the second region are smaller than an area of a single backlight partition, and obtaining a backlight value of a backlight partition corresponding to the second region based on image data of the second region of the second frame image.

6. The method according to claim 1, wherein the display device is a virtual reality VR device, and the determining the first region in the first frame image and the second region in the second frame image as the overlapping regions comprises:
obtaining a first posture of the VR device corresponding to the first frame image and a second posture of the VR device corresponding to the second frame image;
determining a pixel mapping relationship between the first frame image and the second frame image based on the first posture and the second posture; and
determining the first region and the second region based on the pixel mapping relationship.

7. The method according to claim 6, wherein the first posture is characterized by a first posture quaternion $Q_1$, the second posture is characterized by a second posture quaternion $Q_2$, and the determining the pixel mapping relationship between the first frame image and the second frame image comprises:
determining a posture conversion relationship Q for the VR device based on the first posture quaternion $Q_1$ and the second posture quaternion $Q_2$ according to a following equation:

$$Q = Q_2^{-1} * Q_1;$$

obtaining a coordinate conversion relationship M between a VR device coordinate system and an image field of view coordinate system; and
determining the pixel mapping relationship T between the first frame image and the second frame image according to a following equation:

$$T = M^{-1}QM$$

where Q is a matrix form of the posture conversion relationship, and M is a matrix form of the coordinate conversion relationship.

8. The method according to claim 6, wherein the determining the first region and the second region based on the pixel mapping relationship comprises:
mapping a first pixel in the first frame image to a corresponding second pixel in the second posture according to the pixel mapping relationship;
determining that the first pixel and the second pixel belong to the overlapping regions in response to the second pixel being within a range of the second frame image; and
determining the first region and the second region respectively based on the first pixel and second pixel that belong to the overlapping regions.

9. A display device for displaying an image sequence, the image sequence comprising at least a first frame image and a second frame image, the display device comprising:
a backlight module having a plurality of backlight partitions; and
a display controller communicatively connected to the backlight module to control backlight brightnesses of the backlight partitions when the display device displays the image sequence, the display controller being configured to: determine a first region in the first frame image and a second region in the second frame image as overlapping regions, the first region and the second region corresponding to an overlapping portion between the first frame image and second frame image; obtain a second backlight value of a second backlight partition corresponding to the second region based at least partially on a first backlight value of one or more first backlight partitions corresponding to the first region; and control a backlight brightness of the second backlight partition based on the second backlight value when the display device displays the second frame image.

10. The display device according to claim 9, further comprising:
a display module communicatively connected to the display controller and configured to display the image sequence under control of the display controller.

11. The display device according to claim 10, wherein the first frame image and the second frame image are adjacent frames in the image sequence, and the display controller is configured to determine the first region and the second region as the overlapping regions only when areas of the first region and the second region are greater than or equal to an area of a single backlight partition.

12. The display device according to claim 11, wherein the display controller is configured to: determine area occupation ratios in the second backlight partition for multiple first backlight partitions which are in a partially overlapping relationship with the second backlight partition; and determine the second backlight value of the second backlight partition based on first backlight values of the multiple first backlight partitions and their respective area occupation ratios.

13. The display device according to claim 11, wherein the display controller is configured to calculate the second backlight value according to a following equation:

$$B = \sum_{i=1}^{n}\left(\frac{s_i}{s} \times b_i\right)$$

where B is the second backlight value of the second backlight partition, $s_i$ is an overlapping area of the second backlight partition with a $i^{th}$ first backlight partition that is in a partially overlapping relationship with it, s is an area of a single backlight partition, $b_i$ is a first backlight value for the $i^{th}$ first backlight partition, and n is the number of first backlight partitions that are in a partially overlapping relationship with the second backlight partition.

14. The display device according to claim 9, wherein the display controller is configured to determine that the first region and the second region are non-overlapping regions when areas of the first region and the second region are smaller than an area of a single backlight partition, and obtain the backlight value of the backlight partition corresponding to the second region based on image data of the second region.

15. The display device according to claim 9, wherein the display device is a virtual reality VR device, and the display controller is configured to obtain a first posture of the VR device corresponding to the first frame image and a second posture of the VR device corresponding to the second frame image, determine a pixel mapping relationship between the first frame image and the second frame image based on the first posture and the second posture, and determine the first region and the second region based on the pixel mapping relationship.

16. The display device according to claim 15, wherein the display controller is configured to obtain a first posture quaternion $Q_1$ that represents the first posture and a second posture quaternion $Q_2$ that represents the second posture, determine a posture conversion relationship Q of the VR device based on the first posture quaternion $Q_1$ and the second posture quaternion $Q_2$ according to a following equation:

$$Q = Q_2^{-1} * Q_1; \text{ and}$$

the display controller is further configured to obtain a coordinate conversion relationship M between a VR device coordinate system and an image field of view coordinate system, and determine a pixel mapping relationship T between the first frame image and the second frame image according to a following equation:

$$T = M^{-1} Q M$$

where Q is a matrix form of the posture conversion relationship, and M is a matrix form of the coordinate conversion relationship.

17. The display device according to claim 15, wherein the display controller is further configured to map a first pixel in the first frame image to a corresponding second pixel under the second posture according to the pixel mapping relationship, determine that the first pixel and the second pixel belong to the overlapping regions in response to the second pixel being within a range of the second frame image, and determine the first region and the second region respectively based on the first pixel and second pixel that belong to the overlapping regions.

18. The display device according to claim 14, wherein the image data is image data that has been compensated for the backlight value.

19. A non-transitory computer-readable storage medium with a computer program stored thereon, which, when executed by a processor, implement the steps of the method according to claim 1.

20. A computer device, comprising a memory, a processor and a computer program stored on the memory and being runnable on the processor, wherein the processor, upon executing the computer program, implements the steps of the method according to claim 1.

* * * * *